United States Patent
Ohshita et al.

(10) Patent No.: US 6,511,776 B1
(45) Date of Patent: Jan. 28, 2003

(54) POLYMER ELECTROLYTE BATTERY AND POLYMER ELECTROLYTE

(75) Inventors: Ryuji Ohshita, Neyagawa (JP); Toshikazu Yoshida, Hirakata (JP); Koji Nishio, Hirakata (JP); Yoshinori Kida, Katano (JP); Toshiyuki Nohma, Hirakata (JP); Tadashi Teranishi, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/487,895

(22) Filed: Jan. 19, 2000

(30) Foreign Application Priority Data

Jan. 20, 1999 (JP) .................................. 11-012183
Dec. 6, 1999 (JP) .................................. 11-345654

(51) Int. Cl.⁷ ............................................. H01M 6/16
(52) U.S. Cl. ..................... 429/303; 429/306; 429/338; 429/188; 429/231.95
(58) Field of Search ................... 429/303, 306, 429/199, 231.95, 188, 338

(56) References Cited

U.S. PATENT DOCUMENTS

| | | | |
|---|---|---|---|
| 5,237,031 A | | 8/1993 | Kubota et al. ............... 526/305 |
| 5,275,750 A | | 1/1994 | Sato et al. .................. 252/62.2 |
| 5,401,598 A | * | 3/1995 | Miyabayashi et al. ...... 429/218 |
| 5,597,661 A | | 1/1997 | Takeuchi et al. |
| 5,712,059 A | * | 1/1998 | Barker et al. ................ 429/197 |
| 5,861,224 A | * | 1/1999 | Barker et al. ................ 429/194 |
| 5,874,184 A | | 2/1999 | Takeuchi et al. |
| 6,132,904 A | * | 10/2000 | Kamino et al. ............. 429/306 |

FOREIGN PATENT DOCUMENTS

| | | |
|---|---|---|
| EP | 0582410 A1 | 2/1994 |
| EP | 0708452 A1 | 4/1996 |
| JP | 07192756 | 7/1995 |
| JP | 09270271 | 10/1997 |
| JP | 10-208743 | 8/1998 |
| JP | 10-208747 | 8/1998 |
| JP | 10-214638 | 8/1998 |
| JP | 10334945 | 12/1998 |
| JP | 11-40153 | 2/1999 |
| WO | WO 96/26234 | 8/1996 |

OTHER PUBLICATIONS

European Search Report dated Nov. 5, 2000.

* cited by examiner

Primary Examiner—Patrick Ryan
Assistant Examiner—Angela J Martin
(74) Attorney, Agent, or Firm—Armstrong, Westerman & Hattori LLP

(57) ABSTRACT

In a polymer electrolyte battery provided with a positive electrode, a negative electrode, and a polymer electrolyte containing a non-aqueous electrolyte solution, a solvent in said non-aqueous electrolyte solution contains vinylene carbonate in a concentration of 0.1 to 90 vol % so that the non-aqueous electrolyte solution contained in the polymer electrolyte is restrained from reacting with the positive electrode and negative electrode.

31 Claims, 1 Drawing Sheet

POLYMER ELECTROLYTE BATTERY AND POLYMER ELECTROLYTE

BACKGROUND OF THE INVENTION

1. Field of the Invention

The present invention relates generally to a polymer electrolyte battery provided with a positive electrode, a negative electrode, and a polymer electrolyte containing a non-aqueous electrolyte solution, and more particularly, to a polymer electrolyte battery using such a polymer electrolyte characterized in that preservation characteristics of the battery are improved upon improvement of the non-aqueous electrolyte solution contained in the polymer electrolyte.

2. Description of the Related Art

Recently, as one type of advanced batteries featuring high power and high energy density, non-aqueous electrolyte batteries with high energy density have been used. The non-aqueous electrolyte battery employs a non-aqueous electrolyte solution and utilizes a process of oxidation and reduction of lithium and lithium ions.

In the case of the above-mentioned non-aqueous electrolyte battery, however, problems exist that the non-aqueous electrolyte solution leaks out of the battery and that the non-aqueous electrolyte solution reacts with a positive electrode and a negative electrode to degrade the battery characteristics. Therefore, more recently, the spotlight is on a polymer electrolyte battery employing a polymer electrolyte.

Such a polymer electrolyte battery has conventionally generally employed a polymer electrolyte comprising a polymer such as poly(ethylene oxide) and polyvinylidene fluoride containing a solute comprising a lithium salt such as $LiPF_6$. However, such a polymer electrolyte generally suffers low ionic conductivity, whereby sufficient battery characteristics can not be achieved.

Therefore, in recent years, a gelated polymer electrolyte comprising the above-mentioned polymer impregnated with a non-aqueous electrolyte solution obtained by dissolving a solute in an organic solvent such as carbonic ester has been utilized. In this connection, Japanese Patent Laid-Open No. 14506/1990 has proposed a polymer electrolyte comprising a gelated polymer electrolyte whose ionic conductivity is improved by a dibenzylidene sorbitol derivative with at least one ester group added thereto. Further, Japanese Patent Laid-Open No. 289040/1997 has proposed to provide a separator between a gelated polymer electrolyte and a negative electrode, so that characteristics at the interface between the gelated polymer electrolyte and the negative electrode is improved, so that charge/discharge cycle performance of the battery is improved.

Unfortunately, however, even when the gelated polymer electrolyte comprising a polymer impregnated with a non-aqueous electrolyte solution is used as a polymer electrolyte as described above, the non-aqueous electrolyte solution contained in the polymer electrolyte gradually reacts with a positive electrode and a negative electrode to decrease a battery capacity. Especially when the battery is preserved under high temperature conditions, such a reaction makes rapid progress to considerably decrease the battery capacity, whereby preservation characteristics of the battery is degraded.

Further, more recently, Japanese Patent Laid-Open No. 208743/1998 discloses to use an electrolyte solution containing a solvent selected from the group consisting of a number of solvents such as propylene carbonate and ethylene carbonate along with a specific positive electrode material. As one of such selectable solvents, vinylene carbonate is exemplified.

However, the above-mentioned official gazette discloses no operative example using an electrolyte solution containing vinylene carbonate as a solvent. Also, it does not disclose nor suggest an amount of vinylene carbonate contained in the electrolyte solution. The above-mentioned official gazette merely exemplifies vinylene carbonate. There is no reference to the influence on a polymer electrolyte battery from vinylene carbonate contained in the electrolyte solution.

SUMMARY OF THE INVENTION

An object of the present invention is to restrain, in a polymer electrolyte battery provided with a positive electrode, a negative electrode, and a polymer electrolyte containing a non-aqueous electrolyte solution, the non-aqueous electrolyte solution from gradually reacting with the positive electrode and the negative electrode to decrease the battery capacity.

Another object of the invention is to restrain, in the polymer electrolyte battery as described above, the decrease in a battery capacity when the battery in either a charged state or a discharged state is preserved under high temperature conditions.

A polymer electrolyte battery according to the present invention is a polymer electrolyte battery provided with a positive electrode, a negative electrode, and a polymer electrolyte containing a non-aqueous electrolyte solution, wherein a solvent in the above-mentioned non-aqueous electrolyte solution contains vinylene carbonate shown in the following structural formula (1) in a concentration of 0.01 to 90 vol %.

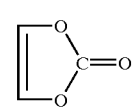

(1)

As in the polymer electrolyte battery according to the present invention, when the solvent in the non-aqueous electrolyte solution contains vinylene carbonate in a concentration of 0.01 to 90 vol %, vinylene carbonate reacts with the positive electrode and the negative electrode at surfaces of the positive electrode and the negative electrode, to form stable layers with excellent ionic conductivity on interfaces between the polymer electrolyte and the positive electrode and between the polymer electrolyte and the negative electrode. The layers restrain the non-aqueous electrolyte solution from gradually reacting with the positive electrode and the negative electrode and hence, even when the battery is preserved under high temperature conditions, the decrease in the battery capacity is restrained, whereby preservation characteristics of the battery is improved.

The reason why the content of vinylene carbonate is set to 0.01 to 90 vol % is that when vinylene carbonate is contained in the concentration of less than 0.01 vol %, stable layers with excellent ionic conductivity can not be successfully formed at interfaces between the polymer electrolyte and the positive electrode and between the polymer electrolyte and the negative electrode and hence, preservation characteristics of the polymer electrolyte battery can not be sufficiently improved. On the other hand, when vinylene carbonate is contained in the concentration of more than 90 vol %, a viscosity of the non-aqueous electrolyte solution is made high to degrade the ionic conductivity of the non-aqueous electrolyte solution, whereby battery characteristics of the polymer electrolyte battery are degraded. Therefore, it is preferable that the solvent in the non-aqueous solution contains vinylene carbonate in a concentration of 0.1 to 80 vol %.

Further, the polymer electrolyte battery according to the present invention may employ as a solvent contained in the non-aqueous electrolyte solution in the polymer electrolyte any solvent containing vinylene carbonate in a concentration of 0.01 to 90 vol % as described above. Vinylene carbonate may be used in combination with other known solvents that have been generally utilized. Examples of such solvents include ethylene carbonate, propylene carbonate, butylene carbonate, dimethyl carbonate, diethyl carbonate, methylethyl carbonate, 1,2-diethoxyethane, 1,2-dimethoxyethane, ethoxymethoxyethane, and the like.

Furthermore, in the polymer electrolyte battery provided with a positive electrode, a negative electrode, and a polymer electrolyte containing a non-aqueous electrolyte solution, when the solvent containing ethylene carbonate, diethyl carbonate, and vinylene carbonate is used as a solvent in the non-aqueous electrolyte solution, decrease in the battery capacity is prevented and sufficient discharge capacity is obtained even in a case where the battery in a discharged state is preserved under high temperature conditions, after which the battery is subjected to another charging to be used. The reason for this is conceivably that when the solvent in the non-aqueous electrolyte solution contains ethylene carbonate, diethyl carbonate, and vinylene carbonate, stable layers are formed on interfaces between the polymer electrolyte and the positive electrode and between the polymer electrolyte and the negative electrode so that the positive electrode and negative electrode are restrained from reacting with the non-aqueous electrolyte solution even in a case where the battery in a discharged state is preserved under high temperature conditions.

When the non-aqueous electrolyte solution employs the solvent containing ethylene carbonate, diethyl carbonate, and vinylene carbonate as described above, if a ratio of vinylene carbonate is too low, layers suitable for bringing this effect are not formed. On the other hand, if a ratio of vinylene carbonate is too high, the above-mentioned layers become thick, resulting in increased resistance. Therefore, the above-mentioned solvent containing ethylene carbonate, diethyl carbonate, and vinylene carbonate preferably contains vinylene carbonate in a concentration of 0.1 to 80 vol % and more preferably 0.1 to 3 vol %.

In the polymer electrolyte battery according to the present invention, a known solute that has been conventionally generally used can be used as a solute dissolved in the above-mentioned solvent contained in the non-aqueous electrolyte solution. Examples of a usable solute include lithium compounds such as $LiPF_6$, $LiBF_4$, $LiN(C_2F_5SO_2)_2$, $LiAsF_6$, $LiSbF_6$, $LiAlF_4$, $LiGaF_4$, $LiInF_4$, $LiClO_4$, $LiN(CF_3SO_2)_2$, $LiCF_3SO_3$, $LiSiF_6$, and $LiC(C_2F_5SO_2)_3$; and a mixture of these. Particularly, in order to further improve the preservation characteristics of the battery, it is preferable to use a compound containing fluorine as a solute. When the compound containing fluorine is used as a solute, it is conceived that more stable layers are formed on interfaces between the polymer electrolyte and the positive electrode and between the polymer electrolyte and the negative electrode to further restrain the positive electrode and negative electrode from reacting with the non-aqueous electrolyte solution.

Further, in the polymer electrolyte battery according to the present invention, it is possible to use, as a polymer for use in a polymer electrolyte containing the above-mentioned non-aqueous electrolyte solution, a known polymer that has been conventionally generally used. Examples of a usable polymer include a polystyrene-polyethylene oxide copolymer, polyethylene oxide, polyvinylidene fluoride, polyacrylonitrile, and the like. Particularly, in order to further improve the preservation characteristics of the battery, it is preferable to use a polymer having a polyethylene oxide chain. When the polymer having a polyethlene oxide chain is used, it is considered that the polyethlene oxide chain is partially broken to react with vinylene carbonate thereby forming a more stable layer on a surface of the negative electrode in a charged state and hence, the positive electrode and the negative electrode is further restrained from reacting with the non-aqueous electrolyte solution.

Furthermore, in the polymer electrolyte battery according to the present invention, materials for composing its positive electrode and negative electrode are not particularly limited, and known materials generally utilized in polymer electrolyte batteries may be used.

Examples of the above-mentioned positive electrode material for composing the positive electrode include a manganese dioxide, a lithium-containing manganese oxide, a lithium-containing cobalt oxide, a lithium-containing vanadium oxide, a lithium-containing nickel oxide, a lithium-containing iron oxide, a lithium-containing chromium oxide, a lithium-containing titanium oxide, and the like.

On the other hand, examples of the above-mentioned negative electrode material for composing the negative electrode include lithium metals; lithium alloys such as Li—Al, Li—In, Li—Sn, Li—Pb, Li—Bi, Li—Ga, Li—Sr, Li—Si, Li—Zn, Li—Cd, Li—Ca, and Li—Ba; carbon materials capable of occluding and discharging lithium ions such as graphite, coke, and calcined organic substances; and metal oxides having lower potentials than the positive electrode material, such as $Li_4Ti_5O_{12}$, $TiO_2$, $Nb_2O_5$, $Fe_2O_3$, $MoO_2$, $MoO_3$, $WO_2$, $WO_3$, $SnO_2$, $SnO$, $SiO_2$, and $SiO$. Particularly, in order to further improve the preservation characteristics of the battery, it is preferable to use the above-mentioned carbon materials or metal oxides. The reason for this is conceivably that large surface areas of carbon materials and metal oxides contribute to the remarkable effect of the above-mentioned layers, and the carbon materials or metal oxides react with vinylene carbonate in the non-aqueous electrolyte solution to form more stable layers.

These and other objects, advantages and features of the invention will become apparent from the following description thereof taken in conjunction with the accompanying drawings which illustrate specific embodiment of the invention.

DESCRIPTION OF THE PREFERRED EMBODIMENTS

Figure 1:
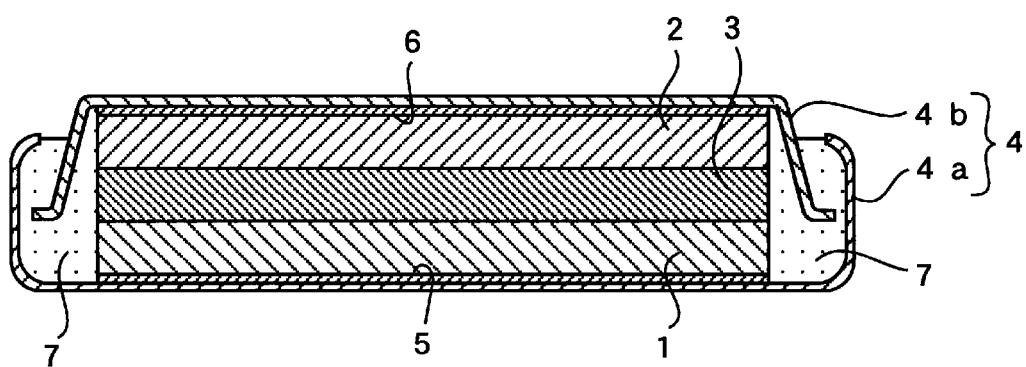
FIG. 1 is a sectional view for illustrating an internal construction of a polymer electrolyte battery fabricated in examples of the present invention.

The following examples specifically illustrate polymer electrolyte batteries according to the present invention. Further, comparative examples will be taken, to make it clear that in the polymer electrolyte batteries of the examples, decrease in the discharge capacity is restrained even when the batteries in a charged state or a discharged state are preserved under high temperature conditions. It should be appreciated that the polymer electrolyte batteries according to the present invention are not particularly limited to those in the following examples, and various changes and modifications may be made in the invention without departing from the spirit and scope thereof.

EXAMPLES A1 TO A4

In polymer electrolyte batteries according to the examples A1 to A4, polymers for use in polymer electrolytes were varied in type. More specifically, the example A1 employed a polystyrene-polyethylene oxide copolymer (PS.PEO copolymer); the example A2 employed polyethylene oxide (PEO); the example A3 employed polyvinylidene fluoride (PVDF); and the example A4 employed polyacrylonitrile (PAN), as shown in the following Table 1.

A positive electrode, a negative electrode, and a polymer electrolyte were fabricated in the following manners, respectively, so as to obtain each polymer electrolyte battery of flat-type, as shown in FIG. 1.

<Fabrication of Positive Electrode>

In fabricating a positive electrode, a lithium-containing cobalt dioxide $LiCoO_2$ heat-treated at a temperature of 800° C. was used as a positive electrode material. A powder of $LiCoO_2$, a powder of carbon as a conductive agent, and polyvinylidene fluoride as a binding agent were mixed in the weight ratio of 85:10:5. The above-mentioned each polymer for use in the polymer electrolyte, i.e., a polystyrene-polyethylene oxide copolymer in Example Al; polyethylene oxide in Example A2; polyvinylidene fluoride in Example A3; and polyacrylonitrile in Example A4, was added to a mixture obtained at a ratio of 5% by weight. Then, N-methyl-2-pyrolidone was further added to the mixture, and the mixture was brought into a slurry. Next, the slurry was applied to an aluminum foil as a positive-electrode current collector by means of the doctor blade coating method. The slurry on the positive-electrode current collector was compressed, and then subjected to vacuum heat-treatment at 130° C., to obtain a disk-like positive electrode 1 having a diameter of 10 mm and a thickness of approximately 80 $\mu$m.

<Fabrication of Negative Electrode>

In fabricating a negative electrode, a natural graphite powder having an average particle size of 10 $\mu$m and $d_{002}$ of 3.35 Å was used as a negative electrode material. The natural graphite powder and polyvinylidene fluoride as a binding agent were mixed in the weight ratio of 95:5.

The above-mentioned each polymer for use in the polymer electrolyte, i.e., a polystyrene-polyethylene oxide copolymer in Example Al; polyethylene oxide in Example A2; polyvinylidene fluoride in Example A3; and polyacrylonitrile in Example A4 was added to a mixture obtained at a ratio of 3% by weight. Then, N-methyl-2-pyrolidone was further added to the mixture, and the mixture was brought into a slurry. Next, the slurry was applied to a copper foil as a negative-electrode current collector by means of the doctor blade coating method. The slurry on the positive-electrode current collector was compressed, and then subjected to vacuum heat-treatment at 130° C., to obtain a disk-like negative electrode 2 having a diameter of 10 mm and a thickness of approximately 70 $\mu$m.

<Fabrication of Polymer Electrolyte>

In fabricating a polymer electrolyte, a disk-like sheet was formed using the above-mentioned each polymer. The sheet was then subjected to vacuum heat-treatment at 130° C., to obtain a disk-like sheet of polymer having a thickness of approximately 30 $\mu$m.

On the other hand, in preparing a non-aqueous electrolyte solution, a mixed solvent obtained by mixing vinylene carbonate and diethyl carbonate in the volume ratio of 4:6, i.e., a mixed solvent containing vinylene carbonate in a concentration of 40 vol %, was used, and lithium hexafluorophosphate $LiPF_6$ was dissolved as a solute in the mixed solvent in the ratio of 1 mol/l, to prepare a non-aqueous electrolytic solution. Subsequently, the non-aqueous electrolytic solution was impregnated into the above-mentioned each disk-like sheet of polymer in a weight ratio of 1:1, so that the sheet was gelated.

<Fabrication of Battery>

In fabricating a battery, a corresponding disk-like sheet of polymer was interposed between the positive electrode 1 and the negative electrode 2 fabricated in the above-mentioned manner, after which the non-aqueous electrolyte solution was impregnated into the above-mentioned each disk-like sheet of polymer in a weight ratio of 1:1 to gelete the sheet, as described above. The corresponding geleted polymer electrolyte 3 was thus interposed between the positive electrode 1 and negative electrode 2, as shown in FIG. 1.

The positive electrode 1, the negative electrode 2, and the gelated polymer electrolyte 3 in this state was contained in a battery case 4 including a positive-electrode can 4a and a negative-electrode can 4b. The positive electrode 1 was connected to the positive-electrode can 4a via the positive-electrode current collector 5 while the negative electrode 2 was connected to the negative-electrode can 4b via the negative-electrode current collector 6. Further, an insulating packing 7 was provided in order to electrically insulated the positive-electrode can 4a and the negative-electrode can 4b from each other as well as to seal the space therebetween. Each polymer electrolyte battery was thus obtained.

COMPARATIVE EXAMPLE a1

In the comparative example a1, a polymer electrolyte battery was fabricated in the same manner as that in the above-mentioned example A1 except that only the non-aqueous electrolyte solution contained in the polymer electrolyte was changed.

In the polymer electrolyte battery according to the comparative example a1, ethylene carbonate was used in place of vinylene carbonate. A mixed solvent obtained by mixing ethylene carbonate and diethyl carbonate in the volume ratio of 4:6 was used, and lithium hexafluorophosphate $LiPF_6$ was dissolved as a solute in the mixed solvent in the ratio of 1 mol/l, to prepare a non-aqueous electrolytic solution. Subsequently, the non-aqueous electrolyte solution was impregnated into the disk-like sheet composed of a polystyrene-polyethylene oxide copolymer (PS.PEO copolymer) in a weight ratio of 1:1 to gelete the sheet.

COMPARATIVE EXAMPLE a2

In the comparative example a2, a polymer electrolyte was not used. A separator formed of a polypropylene porous film was interposed between the positive electrode and the negative electrode, and no polymer was added to either positive electrode or negative electrode. The same non-aqueous electrolyte solution as that in the above-mentioned example A1 to A4 was impregnated into the above-mentioned separator provided between the positive electrode and the negative electrode, to fabricate a non-aqueous electrolyte battery.

COMPARATIVE EXAMPLE a3

In the comparative example a3, a polymer electrolyte battery was fabricated in the same manner as that in the above-mentioned example A1 except that only the non-aqueous electrolyte solution contained in the polymer electrolyte was changed.

In the polymer electrolyte battery according to the comparative example a3, a mixed solvent obtained by mixing ethylene carbonate and diethyl carbonate in the volume ratio of 4:6 was used, and lithium hexafluorophosphate $LiPF_6$ was dissolved as a solute in the mixed solvent in the ratio of 1 mol/l, to prepare a non-aqueous electrolytic solution, after which the non-aqueous electrolyte solution was impregnated into the disk-like sheet composed of a polystyrene-polyethylene oxide copolymer (PS.PEO copolymer) in a weight ratio of 1:1 to gelete the sheet, as in the case of the above-mentioned comparative example al. Further, 1% by weight of p-methoxycarbonyl benzylidene sorbitol was contained in this geleted polymer electrolyte.

Each of the polymer electrolyte batteries according to the examples A1 to A4 and the comparative examples a1 and a3 and non-aqueous electrolyte battery according to the comparative example a2 fabricated as above was charged with a charge current density of 1 $mA/cm^2$ to a charge cut-off voltage of 4.2 V, and was then discharged with a discharge current density of 1 $mA/cm^2$ to a discharge cut-off voltage of 2.75 V at room temperature, to measure a discharge capacity $Q_0$ before preservation in each of the polymer electrolyte batteries and non-aqueous electrolyte battery.

Subsequently, each of the polymer electrolyte batteries and non-aqueous electrolyte battery was charged with a charge current density of 1 $mA/cm^2$ to a charge cut-off voltage of 4.2 V at room temperature. Each of the batteries was preserved for 20 days at a temperature of 60° C. and thereafter, returned to place at room temperature. Each of the batteries was then discharged with a discharge current density of 1 $mA/cm^2$ to a discharge cut-off voltage of 2.75 V, to measure a discharge capacity $Q_1$ after the preservation in the charged state in each of the polymer electrolyte batteries and non-aqueous electrolyte battery.

The percentage of capacity retention (%) after the preservation in the charged state was then found on the basis of the following equation (1). The results were shown in the following Table 1.

$$\text{Percentage of capacity retention (\%)} = (Q_1/Q_0) \times 100 \quad (1)$$

TABLE 1

| | type of polymer | discharge capacity (mAh) | | percentage of capacity retention (%) |
|---|---|---|---|---|
| | | before preservation | after preservation | |
| example A1 | PS.PEO copolymer | 2.10 | 1.85 | 88.1 |
| example A2 | PEO | 2.10 | 1.80 | 85.7 |
| example A3 | PVDF | 2.10 | 1.75 | 83.3 |
| example A4 | PAN | 2.10 | 1.70 | 81.0 |
| comparative example a1 | PS.PEO copolymer | 2.05 | 1.40 | 68.3 |
| comparative example a2 | — | 2.00 | 1.35 | 67.5 |
| comparative example a3 | PS.PEO copolymer | 1.95 | 0.80 | 41.0 |

As apparent form the results, each of the polymer electrolyte batteries in the examples A1 to A4 employing the gelated polymer electrolyte containing the non-aqueous solution having vinylene carbonate therein presented slighter decrease in the discharge capacity after the preservation in the charged state under high temperature conditions and was increased in the percentage of capacity retention, resulting in improved preservation characteristics of the battery, as compared with each of the polymer electrolyte batteries in the comparative examples a1 and a3 employing the gelated polymer electrolyte containing the non-aqueous solution having no vinylene carbonate therein, and the non-aqueous electrolyte battery in the comparative example a2 wherein a polymer electrolyte was not employed.

Further, when the polymer electrolyte batteries in the examples A1 to A4 were compared with each other, it was found that the polymer electrolyte batteries in the examples A1 and A2 respectively employing the polystyrene-polyethylene oxide copolymer (PS.PEO copolymer) having a polyethlene oxide chain and polyethylene oxide (PEO) as polymers in the electrolytes were further increased in the percentage of capacity retention, resulting in further improved preservation characteristics of the batteries.

EXAMPLES A5 TO A11 AND COMPARATIVE EXAMPLE a4

In the examples A5 to A11 and the comparative Example a4, polymer electrolyte batteries were fabricated in the same manner a s that in th e above-mentioned example A1 except that the volume ratio between vinylene carbonate (VC) and diethyl carbonate (DEC), which were used as the solvent in the non-aqueous electrolyte solution, was changed in the fabrication of non-aqueous electrolyte solution in the examples A1 to A4. More specifically, VC was contained in the solvent in a concentration of 0.01 vol % in the example A5; 0.1 vol % in the example A6; 1 vol % in the example A7; 20 vol % in the example A8; 60 vol % in the example A9; 80 vol % in the example A10; 90 vol % in the example A11; and 0 vol % in the comparative example a4, as shown in the following Table 2.

With respect to each of the polymer electrolyte batteries according to the examples A5 to A11 and the comparative example a4 fabricated as above, the percentage of capacity retention after preservation in the charged state was found in the same manner as that in the above-mentioned examples A1 to A4. Each of the polymer electrolyte batteries according to the examples A5 to A11 and the comparative example a4 was charged with a charge current density of 1 $mA/cm^2$ to a charge cut-off voltage of 4.2 V, and was then discharged with a discharge current density of 1 $mA/cm^2$ to a discharge cut-off voltage of 2.75 V at room temperature, to measure a discharge capacity $Q_0$ before preservation in each of the batteries. Subsequently, each of the polymer electrolyte batteries was charged with a charge current density of 1 $mA/cm^2$ to a charge cut-off voltage of 4.2 V at room temperature. Each of the batteries was preserved for 20 days at a temperature of 60° C. and thereafter, returned to place at room temperature. Each of the batteries was then discharged with a discharge current density of 1 $mA/cm^2$ to a discharge cut-off voltage of 2.75 V, to measure a discharge capacity $Q_1$ after the preservation in each of the batteries. The percentage of capacity retention (%) after the preservation in the charged state was then found on the basis of the foregoing equation (1). The results, along with that of the above-mentioned example A1, are shown in the following Table 2.

TABLE 2

| | volume ratio of VC in solvent (vol %) | discharge capacity (mAh) | | percentage of capacity retention (%) |
|---|---|---|---|---|
| | | before preservation | after preservation | |
| example A5 | 0.01 | 2.00 | 1.60 | 80.0 |
| example A6 | 0.1 | 2.00 | 1.70 | 85.0 |
| example A7 | 1 | 2.10 | 1.80 | 85.7 |
| example A8 | 20 | 2.05 | 1.80 | 87.8 |
| example A1 | 40 | 2.10 | 1.85 | 88.1 |
| example A9 | 60 | 2.05 | 1.80 | 87.8 |
| example A10 | 80 | 2.00 | 1.70 | 85.0 |
| example A11 | 90 | 2.00 | 1.60 | 80.0 |
| comparative example a4 | 0 | 2.05 | 1.40 | 68.3 |

As apparent form the results, each of the polymer electrolyte batteries in the examples A1, and A5 to A11 employing the non-aqueous electrolyte solution wherein vinylene carbonate was contained in the solvent in a concentration of 0.01 to 90 vol % presented slighter decrease in the discharge capacity after the preservation in the charged state under high temperature conditions and was increased in the percentage of capacity retention, as compared with the polymer electrolyte battery in the comparative example a4 employing the gelated polymer electrolyte containing the non-aqueous solution having no vinylene carbonate therein.

Further, when the polymer electrolyte batteries in the examples A1, and A5 to A11 were compared with each other, it was found that each of the polymer electrolyte batteries in the examples A1, and A6 to A10 employing the non-aqueous electrolyte solution wherein vinylene carbonate was contained in the solvent in a concentration of 0.1 to 80 vol % presented even slighter decrease in the discharge capacity after the preservation in the charged state under high temperature conditions and was further increased in the percentage of capacity retention.

EXAMPLES A12 TO A16

In the examples A12 to A16, polymer electrolyte batteries were fabricated in the same manner as that in the above-mentioned example A1 except that the type of solute contained in the non-aqueous electrolyte solutions was changed as shown in the following Table 3 in the fabrication of non-aqueous electrolyte solution in the above-mentioned examples A1 to A4. More specifically, the Example A12 employed $LiAsF_6$; the Example A13 employed $LiBF_4$; the Example A14 employed $LiCF_3SO_3$; the Example A15 employed $LiN(C_2F_5SO_2)_2$; and the Example A16 employed $LiClO_4$, as a solute in the non-aqueous electrolyte solution, and each solute was dissolved in the ratio of 1 mol/l in the mixed solvent containing vinylene carbonate and diethyl carbonate in the volume ratio of 4:6, to prepare each non-aqueous electrolytic solution.

With respect to each of the polymer electrolyte batteries according to the examples A12 to A16 fabricated as above, the percentage of capacity retention after preservation in the charged state was found in the same manner as that in the above-mentioned examples A1 to A4. Each of the polymer electrolyte batteries according to the example A12 to A16 was charged with a charge current density of 1 mA/cm² to a charge cut-off voltage of 4.2 V, and was then discharged with a discharge current density of 1 mA/cm² to a discharge cut-off voltage of 2.75 V at room temperature, to measure a discharge capacity $Q_0$ before preservation in each of the batteries. Subsequently, each of the polymer electrolyte batteries was charged with a charge current density of 1 mA/cm² to a charge cut-off voltage of 4.2 V at room temperature. Each of the batteries was preserved for 20 days at a temperature of 60° C. and thereafter, returned to place at room temperature. Each of the batteries was then discharged with a discharge current density of 1 mA/cm² to a discharge cut-off voltage of 2.75 V, to measure a discharge capacity $Q_1$ after the preservation in each of the batteries. The percentage of capacity retention (%) after the preservation in the charged state was then found on the basis of the foregoing equation (1). The results, along with that of the above-mentioned example A1, are shown in the following Table 3.

TABLE 3

| | type of solute | discharge capacity (mAh) | | percentage of capacity retention (%) |
|---|---|---|---|---|
| | | before preservation | after preservation | |
| example A1 | $LiPF_6$ | 2.10 | 1.85 | 88.1 |
| example A12 | $LiAsF_6$ | 2.05 | 1.80 | 87.8 |
| example A13 | $LiBF_4$ | 2.00 | 1.70 | 85.0 |
| example A14 | $LiCF_3SO_3$ | 2.00 | 1.70 | 85.0 |
| example A15 | $LiN(C_2F_5SO_2)_2$ | 2.05 | 1.75 | 85.4 |
| example A16 | $LiClO_4$ | 2.00 | 1.60 | 80.0 |

As apparent form the results, each of the polymer electrolyte batteries in the examples A12 to A16 employing the gelated polymer electrolyte containing the non-aqueous solution having vinylene carbonate therein presented slighter decrease in the discharge capacity after the preservation in the charged state under high temperature conditions and was increased in the percentage of capacity retention, as compared with the above-mentioned polymer electrolyte batteries and the non-aqueous electrolyte battery in the comparative examples al to a4.

Further, when the polymer electrolyte batteries in the examples A1, A12 to A16 were compared with each other, it was found that each of the polymer electrolyte batteries in the examples A1, A12 to A15 employing the compound containing fluorine as the solute in th e non-aqueous electrolyte solution was increased in the percentage of capacity retention after the preservation in the charged state, as compared with the polymer electrolyte battery in the example A16 employing $LiClO_4$, which contains no fluorine, as the solute in the non-aqueous electrolyte solution.

EXAMPLES A17 TO A20

In each of the polymer electrolyte batteries according to the examples A17 to A20, a negative electrode material to be used was changed as shown in the following Table 4 in the fabrication of the negative electrode in the above-mentioned examples A1 to A4.

Negative electrodes in the polymer electrolyte batteries according to the examples A17 and A18 were fabricated in the same manner as that in the above-mentioned example A1 except that the example A17 and A18 respectively employed an artificial graphite powder having $d_{002}$ of 3.37 Å and petroleum coke powder having $d_{002}$ of 3.47 Å as the negative electrode materials. Further, the example A19 employed $Li_4Ti_5O_{12}$ powder as the negative electrode material. The negative electrode material $Li_4Ti_5O_{12}$ powder, carbon black as a conductive agent, and polyvinylidene fluoride as a binding agent were mixed in the weight ratio of 90:5:5, after which the same procedure as that in the above-mentioned example A1 was taken to fabricate a negative electrode. Furthermore, the example A20 employed a negative electrode obtained by punching a rolled sheet of a lithium metal in a circular shape.

Except for the above, the same procedure as that in the above-mentioned example A1 was taken, and vinylene carbonate was contained in a mixed solvent containing vinylene carbonate and diethyl carbonate in a concentration of 40 vol %, to fabricate each polymer electrolyte battery.

With respect to each of the polymer electrolyte batteries according to the examples A17 to A20 fabricated as above, the percentage of capacity retention after preservation in the charged state was found in the same manner as that in the above-mentioned examples A1 to A4. Each of the polymer electrolyte batteries according to the example A17 to A20 was charged with a charge current density of 1 mA/cm$^2$ to a charge cut-off voltage of 4.2 V, and was then discharged with a discharge current density of 1 mA/cm$^2$ to a discharge cut-off voltage of 2.75 V at room temperature, to measure a discharge capacity $Q_0$ before preservation in each of the batteries. Subsequently, each of the polymer electrolyte batteries was charged with a charge current density of 1 mA/cm$^2$ to a charge cut-off voltage of 4.2 V at room temperature. Each of the batteries was preserved for 20 days at a temperature of 60° C. and thereafter, returned to place at room temperature. Each of the batteries was then discharged with a discharge current density of 1 mA/cm$^2$ to a discharge cut-off voltage of 2.75 V, to measure a discharge capacity $Q_1$ after the preservation in each of the batteries. The percentage of capacity retention (%) after the preservation in the charged state was then found on the basis of the foregoing equation (1). The results, along with that of the above-mentioned example A1, are shown in the following Table 4.

TABLE 4

| | type of negative electrode material | discharge capacity (mAh) | | percentage of capacity retention (%) |
| --- | --- | --- | --- | --- |
| | | before preservation | after preservation | |
| example A1 | natural graphite | 2.10 | 1.85 | 88.1 |
| example A17 | artificial graphite | 2.05 | 1.80 | 87.8 |
| example A18 | petroleum coke | 2.05 | 1.80 | 87.8 |
| example A19 | Li$_4$Ti$_5$O$_{12}$ | 2.00 | 1.75 | 87.5 |
| example A20 | lithium metal | 2.05 | 1.65 | 80.5 |

As apparent form the results, each of the polymer electrolyte batteries in the examples A17 to A20 employing the gelated polymer electrolyte containing the non-aqueous solution having vinylene carbonate therein presented slighter decrease in the discharge capacity after the preservation in the charged state under high temperature conditions and was increased in the percentage of capacity retention, as compared with the above-mentioned polymer electrolyte batteries and the non-aqueous electrolyte battery in the comparative examples a1 to a4.

Further, when the polymer electrolyte batteries in the examples A1, and A17 to A20 were compared with each other, it was found that the polymer electrolyte batteries in the examples A1, and A17 to A19 employing the carbon materials or the metal oxide as the negative electrode materials for use in the negative electrodes were increased in the percentage of capacity retention after the preservation in the charged state, as compared with the polymer electrolyte battery in the example A20 employing the lithium metal as the negative electrode material for use in the negative electrode.

EXAMPLES B1 TO B3

In each of the polymer electrolyte according to the examples B1 to B3, polyethylene oxide (PEO) was employed as a polymer in a polymer electrolyte as in the above-mentioned example A2. A positive electrode and a negative electrode were fabricated in the same manner as that in the above-mentioned example A2.

Further, in fabricating each polymer electrolyte, a disk-like sheet was formed using the above-mentioned polyethylene oxide, after which the sheet was subjected to vacuum heat-treatment at 130° C., to obtain a disk-like sheet of polymer having a thickness of approximately 30 μm. The disk-like sheet of polymer thus obtained was used as in the case of the above-mentioned example A2.

On the other hand, as a solvent in a non-aqueous electrolyte solution, the example B1 employed a mixed solvent containing vinylene carbonate (VC) in a concentration of 1 vol % obtained by adding vinylene carbonate (VC) to a mixed solvent containing ethylene carbonate (EC) and diethyl carbonate (DEC) in the volume ratio of 4:6; the example B2 employed a mixed solvent containing vinylene carbonate (VC) in a concentration of 1 vol % obtained by adding vinylene carbonate (VC) to a mixed solvent containing ethylene carbonate (EC), diethyl carbonate (DEC), and dimethyl carbonate (DMC) in the volume ratio of 4:3:3; and the example B3 employed a mixed solvent containing vinylene carbonate (VC) in a concentration of 1 vol % obtained by adding vinylene carbonate (VC) to a mixed solvent containing ethylene carbonate (EC) and dimethyl carbonate (DMC) in the volume ratio of 4:6, as shown in the following Table 5.

Then, lithium hexafluorophosphate LiPF$_6$ was dissolved as a solute in the above-mentioned each mixed solvent in the ratio of 1 mol/l, to prepare each non-aqueous electrolytic solution.

Subsequently, each of the non-aqueous electrolytic solutions thus prepared was impregnated into the above-mentioned disk-like sheet of polymer in a weight ratio of 1:1 so that the sheet was gelated, to obtain each polymer electrolyte.

Polymer electrolyte batteries in the examples B1 to B3 were fabricated in the same manner as that in the above-mentioned examples A1 to A4 except that the above-mentioned positive electrodes, negative electrodes, and polymer electrolytes were used.

COMPARATIVE EXAMPLE b1

In the comparative example b1, a polymer electrolyte was not used. No polymer was added to either a positive electrode or a negative electrode, and a separator formed of a polypropylene porous film was interposed between the positive electrode and the negative electrode.

As a non-aqueous electrolyte solution, a mixed solvent containing vinylene carbonate (VC) in a concentration of 1 vol % obtained by adding vinylene carbonate (VC) to a mixed solvent containing ethylene carbonate (EC) and diethyl carbonate (DEC) in the volume ratio of 4:6 was used, and lithium hexafluorophosphate LiPF$_6$ was dissolved as a solute in the mixed solvent in the ratio of 1 mol/l, to prepare a non-aqueous electrolytic solution. The non-aqueous electrolytic solution was impregnated into the above-mentioned separator, to prepare a non-aqueous electrolyte battery.

Each of the polymer electrolyte batteries according to the examples B1 to B3 and non-aqueous electrolyte battery according to the comparative example b1 fabricated as above was charged with a charge current density of 1 mA/cm$^2$ to a charge cut-off voltage of 4.2 V, and was then discharged with a discharge current density of 1 mA/cm$^2$ to a discharge cut-off voltage of 2.75 V at room temperature, to measure a discharge capacity $Q_0$ before preservation in each of the polymer electrolyte batteries and non-aqueous electrolyte battery.

Subsequently, each of the polymer electrolyte batteries and non-aqueous electrolyte battery thus discharged was preserved for 90 days at a temperature of 60° C. and thereafter, returned to place at room temperature. Each of the batteries was charged with a charge current density of 1 mA/cm$^2$ to a charge cut-off voltage of 4.2 V and was then discharged with a discharge current density of 1 mA/cm$^2$ to a discharge cut-off voltage of 2.75 V at room temperature, to measure a discharge capacity $Q_1'$ after the preservation in the discharged state in each of the polymer electrolyte batteries and non-aqueous electrolyte battery.

The percentage of capacity retention (%) after preservation in the discharged state was then found on the basis of the following equation (2). The results were shown in the following Table 5.

$$\text{Percentage of capacity retention (\%)}=(Q_1'/Q_0)\times 100 \qquad (2)$$

TABLE 5

| type | type of solvent | volume ratio of VC (vol %) | type of polymer | discharge capacity (mAh) before preservation | discharge capacity (mAh) after preservation | percentage of capacity retention (%) |
|---|---|---|---|---|---|---|
| example B1 | EC + DEC + VC | 1 | PEO | 2.10 | 2.08 | 99 |
| example B2 | EC + DEC + DMC + VC | 1 | PEO | 2.10 | 2.06 | 98 |
| example B3 | EC + DMC + VC | 1 | PEO | 2.10 | 1.80 | 86 |
| comparative example b1 | EC + DEC + VC | 1 | — | 2.00 | 0.30 | 15 |

As apparent form the results, each of the polymer electrolyte batteries in the examples B1 to B3 employing the gelated polymer electrolyte containing the non-aqueous solution having vinylene carbonate therein presented slighter decrease in the discharge capacity after the preservation for 90 days in the discharged state at a temperature of 60° C. and was increased in the percentage of capacity retention after the preservation in the discharged state under high temperature conditions, as compared with the non-aqueous electrolyte battery in the comparative examples b1 wherein the non-aqueous electrolyte solution having vinylene carbonate therein was not contained in a polymer.

Further, when the polymer electrolyte batteries in the examples B1 to B3 were compared with each other, it was found that each of the polymer electrolyte batteries in the examples B1 and B2 employing the mixed solvent containing at least ethylene carbonate (EC), diethyl carbonate (DEC), and vinylene carbonate (VC) as the solvent in the non-aqueous electrolyte solution presented even slighter decrease in the discharge capacity after the preservation in the discharged state under high temperature conditions and was further increased in the percentage of capacity retention.

EXAMPLES B4 TO B9

In each of the polymer electrolyte batteries according to the examples B4 to B9, a mixed solvent obtained by adding vinylene carbonate (VC) to a mixed solvent containing ethylene carbonate (EC) and diethyl carbonate (DEC) in the volume ratio of 4:6 was used as a solvent in a non-aqueous electrolyte solution, as in the case of the above-mentioned example B1.

Polymer electrolyte batteries in the examples B4 to B9 were fabricated in the same manner as that in the above-mentioned example B1 except that the amount of the above-mentioned vinylene carbonate (VC) was changed. More specifically, vinylene carbonate (VC) was contained in the solvent in a concentration of 0.01 vol % in the example B4; 3 vol % in the example B5; 5 vol % in the example B6; 10 vol % in the example B7; 50 vol % in the example B8; and 80 vol % in the example B9, as shown in the following Table 6.

COMPARATIVE EXAMPLES b2 AND b3

In the polymer electrolyte battery according to the comparative example b2, a mixed solvent containing ethylene carbonate (EC) and diethyl carbonate (DEC) in the volume ratio of 4:6 was used as a solvent in a non-aqueous electrolyte solution, and no vinylene carbonate (VC) was added to the mixed sovent. On the other hand, in the polymer electrolyte battery according to the comparative example b3, only vinylene carbonate (VC) was used as a solvent in a non-aqueous electrolyte solution. Except for the above, the polymer electrolyte batteries in the comparative example b2 and b3 were fabricated in the same manner as that in the above-mentioned example B1.

With respect to each of the polymer electrolyte batteries according to the examples B4 to B9 and the comparative examples b2 and b3 fabricated as above, the percentage of capacity retention after preservation in the discharged state was found in the same manner as that in the above-mentioned examples B1 to B3. Each of the polymer electrolyte batteries according to the examples B4 to B9 and the comparative examples b2 and b3 was charged with a charge current density of 1 mA/cm$^2$ to a charge cut-off voltage of 4.2 V, and was then discharged with a discharge current density of 1 mA/cm$^2$ to a discharge cut-off voltage of 2.75 V at room temperature, to measure a discharge capacity $Q_0$ before preservation in each of the batteries. Subsequently, each of the batteries thus discharged was preserved for 90 days at a temperature of 60° C. and thereafter, returned to place at room temperature. Each of the polymer electrolyte batteries was charged with a charge current density of 1 mA/cm$^2$ to a charge cut-off voltage of 4.2 V and was then discharged with a discharge current density of 1 mA/cm$^2$ to a discharge cut-off voltage of 2.75 V at room temperature, to measure a discharge capacity $Q_1'$ after the preservation in the discharged state in each of the batteries. The percentage of capacity retention (%) after the preservation in the discharged state was then found on the basis of the foregoing equation (2). The results, along with that of the above-mentioned example B1, are shown in the following Table 6.

TABLE 6

| | volume ratio of VC in solvent (vol %) | discharge capacity (mAh) | | percentage of capacity retention (%) |
| --- | --- | --- | --- | --- |
| | | before preservation | after preservation | |
| example B4 | 0.1 | 2.10 | 2.04 | 97 |
| example B1 | 1 | 2.10 | 2.08 | 99 |
| example B5 | 3 | 2.10 | 2.04 | 97 |
| example B6 | 5 | 2.10 | 1.75 | 83 |
| example B7 | 10 | 2.10 | 1.70 | 81 |
| example B8 | 50 | 2.05 | 1.65 | 80 |
| example B9 | 80 | 1.90 | 1.50 | 79 |
| comparative example b2 | 0 | 2.00 | 0.30 | 15 |
| comparative example b3 | 100 | 1.05 | 0.16 | 15 |

As apparent form the results, each of the polymer electrolyte batteries in the examples B1, and B4 to B9 wherein, in a case a mixed solvent containing at least ethylene carbonate (EC), diethyl carbonate (DEC), and vinylene carbonate (VC) was employed as the solvent in the non-aqueous electrolyte solution, said mixed solvent contained vinylene carbonate in a concentration of 0.1 to 80 vol % presented slighter decrease in the discharge capacity after the preservation in the discharged state under high temperature conditions and was increased in the percentage of capacity retention, as compared with the polymer electrolyte battery in the comparative examples b2 employing the non-aqueous electrolyte solution containing no vinylene carbonate in the solvent and the polymer electrolyte battery in the comparative examples b3 employing the non-aqueous electrolyte solution containing only vinylene carbonate as the solvent.

Further, when the polymer electrolyte batteries in the examples B1, and B5 to B9 were compared with each other, it was found that each of the polymer electrolyte batteries in the examples B1, B4, and B5 wherein the above-mentioned solvent in the non-aqueous electrolyte solution contained vinylene carbonate in a concentration of 0.1 to 3 vol % presented even slighter decrease in the discharge capacity after the preservation in the discharged state under high temperature conditions and was further increased in the percentage of capacity retention.

EXAMPLES B10 AND B11

In the examples B10 and B11, polymer electrolyte batteries were fabricated in the same manner as that in the above-mentioned example B1 except that the type of polymer for use in the polymer electrolyte was changed. More specifically, the example B10 employed polyvinylidene fluoride (PVDF); and the example B11 employed polyacrylonitrile (PAN) as a polymer in a polymer electrolyte, as shown in the following Table 7, and positive electrodes and negative electrodes respectively contained corresponding polymers.

With respect to each of the polymer electrolyte batteries according to the examples B10 and B11 fabricated as above, the percentage of capacity retention after preservation in the discharged state was found in the same manner as that in the above-mentioned examples B1 to B3. Each of the polymer electrolyte batteries according to the example B10 and B11 was charged with a charge current density of 1 mA/cm$^2$ to a charge cut-off voltage of 4.2 V, and was then discharged with a discharge current density of 1 mA/cm$^2$ to a discharge cut-off voltage of 2.75 V at room temperature, to measure a discharge capacity $Q_0$ before preservation in each of the batteries. Subsequently, each of the batteries thus discharged was preserved for 90 days at a temperature of 60° C. and thereafter, returned to place at room temperature. Each of the polymer electrolyte batteries was charged with a charge current density of 1 mA/cm$^2$ to a charge cut-off voltage of 4.2 V and was then discharged with a discharge current density of 1 mA/cm$^2$ to a discharge cut-off voltage of 2.75 V at room temperature, to measure a discharge capacity $Q_1'$ after the preservation in the discharged state in each of the batteries. The percentage of capacity retention (%) after the preservation in the discharged state was then found on the basis of the foregoing equation (2). The results, along with that of the above-mentioned example B1, are shown in the following

TABLE 7

| | type of polymer | discharge capacity (mAh) | | percentage of capacity retention (%) |
| --- | --- | --- | --- | --- |
| | | before preservation | after preservation | |
| example B1 | PEO | 2.10 | 2.08 | 99 |
| example B10 | PVDF | 2.05 | 1.83 | 89 |
| example B11 | PAN | 2.00 | 1.70 | 85 |

As apparent from the result, when the polymer electrolyte batteries in the examples B1, B10 and B11 were compared with each other, it was found that the polymer electrolyte battery in the examples B1 employing polyethylene oxide (PEO) as the polymer in the polymer electrolyte presented slighter decrease in the discharge capacity after the preservation in the discharged state under high temperature conditions and was increased in the percentage of capacity retention, as compared with the polymer electrolyte batteries in the examples B10 and B11 respectively employing polyvinylidene fluoride (PVDF) and polyacrylonitrile (PAN) both having no polyethlene oxide chain.

Although the present invention has been fully described by way of examples, it is to be noted that various changes and modifications will be apparent to those skilled in the art.

Therefore, unless otherwise such changes and modifications depart from the scope of the present invention, they should by construed as being included therein.

What is claimed is:

1. A polymer electrolyte battery provided with a positive electrode, a negative electrode, and a polymer electrolyte containing a non-aqueous electrolyte solution, wherein
said non-aqueous electrolyte solution contains a solute and a solvent, and said solvent consists essentially of:
vinylene carbonate in a concentration of 0.01 to 90 vol %; and
one or more chain carbonic esters selected from the group consisting of dimethyl carbonate, methylethyl carbonate and diethyl carbonate.

2. The polymer electrolyte battery according to claim 1, wherein
said solvent in the non-aqueous electrolyte solution contains vinylene carbonate in a concentration of 0.1 to 80 vol %.

3. The polymer electrolyte battery according to claim 1, wherein
said solute contained in the non-aqueous electrolyte solution is a compound containing fluorine.

4. The polymer electrolyte battery according to claim 1, wherein
a polymer in said polymer electrolyte has a polyethlene oxide chain.

5. The polymer electrolyte battery according to claim 1, wherein
a negative electrode material for use in said negative electrode is a carbon material or a metal oxide.

6. A polymer electrolyte battery provided with a positive electrode, a negative electrode, and a polymer electrolyte containing a non-aqueous electrolyte solution, wherein
said non-aqueous electrolyte solution contains a solute and a solvent, and said solvent consists essentially of:
vinylene carbonate in a concentration of 0.01 to 90 vol %;
one or more cyclic carbonic esters selected from the group consisting of ethylene carbonate and butylene carbonate; and
one or more chain carbonic esters selected from the group consisting of dimethyl carbonate, methylethyl carbonate and diethyl carbonate.

7. The polymer electrolyte battery according to claim 6, wherein
said solvent in the non-aqueous electrolyte solution contains vinylene carbonate in a concentration of 0.1 to 80 vol %.

8. The polymer electrolyte battery according to claim 6, wherein
said solvent in the non-aqueous electrolyte solution contains vinylene carbonate in a concentration of 0.1 to 3 vol %.

9. The polymer electrolyte battery according to claim 6, wherein
said solute contained in the non-aqueous electrolyte solution is a compound containing fluorine.

10. The polymer electrolyte battery according to claim 6, wherein
a polymer in said polymer electrolyte has a polyethlene oxide chain.

11. The polymer electrolyte battery according to claim 6, wherein
a negative electrode material used in said negative electrode is a carbon material or a metal oxide.

12. A polymer electrolyte comprising a polymer containing a non-aqueous electrolyte solution, wherein
said non-aqueous electrolyte solution contains a solute and a solvent, and said solvent consists essentially of:
vinylene carbonate in a concentration of 0.01 to 90 vol %; and
one or more chain carbonic esters selected from the group consisting of dimethyl carbonate, methylethyl carbonate and diethyl carbonate.

13. The polymer electrolyte according to claim 12, wherein
said solvent in the non-aqueous electrolyte solution contains vinylene carbonate in a concentration of 0.1 to 80 vol %.

14. The polymer electrolyte according to claim 12, wherein
said solute contained in the non-aqueous electrolyte solution is a compound containing fluorine.

15. The polymer electrolyte according to claim 12, wherein
said polymer in the polymer electrolyte has a polyethlene oxide chain.

16. A polymer electrolyte comprising a polymer containing a non-aqueous electrolyte solution, wherein
said non-aqueous electrolyte solution contains a solute and a solvent, and said solvent consists essentially of:
vinylene carbonate in a concentration of 0.01 to 90 vol %;
one or more cyclic carbonic esters selected from the group consisting of ethylene carbonate and butylene carbonate; and
one or more chain carbonic esters selected from the group consisting of dimethyl carbonate, methylethyl carbonate and diethyl carbonate.

17. The polymer electrolyte according to claim 16, wherein
said solvent in the non-aqueous electrolyte solution contains vinylene carbonate in a concentration of 0.1 to 80 vol %.

18. The polymer electrolyte according to claim 16, wherein
said solvent in the non-aqueous electrolyte solution contains vinylene carbonate in a concentration of 0.1 to 3 vol %.

19. The polymer electrolyte battery according to claim 16, wherein
said solute contained in the non-aqueous electrolyte solution is a compound containing fluorine.

20. The polymer electrolyte battery according to claim 6, wherein
said polymer in the polymer electrolyte has a polyethlene oxide chain.

21. A polymer electrolyte battery provided with a positive electrode, a negative electrode, and a polymer electrolyte containing a non-aqueous electrolyte solution, wherein
said non-aqueous electrolyte solution contains a solute and a solvent, and said solvent consists essentially of:
vinylene carbonate in a concentration of 0.01 to 90 vol %;
ethylene carbonate as a cyclic carbonic ester; and
one or more chain carbonic esters selected from the group consisting of dimethyl carbonate, methylethyl carbonate, and diethyl carbonate.

22. The polymer electrolyte battery according to claim 21, wherein
said non-aqueous electrolyte solution contains vinylene carbonate in a concentration of 0.1 to 80 vol %.

23. The polymer electrolyte battery according to claim 21, wherein
said non-aqueous electrolyte solution contains vinylene carbonate in a concentration of 0.1 to 3.0 vol %.

24. The polymer electrolyte battery according to claim 21, wherein
said solute contained in said non-aqueous electrolyte solution contains fluorine.

25. The polymer electrolyte battery according to claim 21, wherein
a polymer in said polymer electrolyte has a polyethylene oxide chain.

26. The polymer electrolyte battery according to claim 21, wherein
a negative electrode material for use in said negative electrode is a carbon material or a metal oxide.

27. A polymer electrolyte comprising a polymer containing a non-aqueous electrolyte solution, wherein
said non-aqueous electrolyte solution contains a solute and a solvent, and said solvent consists essentially of:
vinylene carbonate in a concentration of 0.01 to 90 vol %;
ethylene carbonate as a cyclic carbonic ester; and
one or more chain carbonic esters selected from the group consisting of dimethyl carbonate, methyl ethyl carbonate, and diethyl carbonate.

28. The polymer electrolyte according to claim 27, wherein
said non-aqueous electrolyte solution contains vinylene carbonate in a concentration of 0.1 to 80 vol %.

29. The polymer electrolyte according to claim 27, wherein
said non-aqueous electrolyte solution contains vinylene carbonate in a concentration of 0.1 to 3.0 vol %.

30. The polymer electrolyte according to claim 27, wherein
said solute contained in said non-aqueous electrolyte solution contains fluorine.

31. The polymer electrolyte according to claim 27, wherein
a polymer in said polymer electrolyte has a polyethylene oxide chain.

* * * * *